United States Patent
Kaneko

(10) Patent No.: US 10,248,460 B2
(45) Date of Patent: Apr. 2, 2019

(54) STORAGE MANAGEMENT COMPUTER

(71) Applicant: Hitachi, Ltd., Tokyo (JP)

(72) Inventor: Satoshi Kaneko, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 68 days.

(21) Appl. No.: 15/320,025

(22) PCT Filed: Mar. 27, 2015

(86) PCT No.: PCT/JP2015/059536
§ 371 (c)(1),
(2) Date: Dec. 19, 2016

(87) PCT Pub. No.: WO2016/157274
PCT Pub. Date: Oct. 6, 2016

(65) Prior Publication Data
US 2017/0132044 A1 May 11, 2017

(51) Int. Cl.
*G06F 9/00* (2006.01)
*G06F 9/50* (2006.01)
(Continued)

(52) U.S. Cl.
CPC ............ *G06F 9/5016* (2013.01); *G06F 3/061* (2013.01); *G06F 3/0605* (2013.01); *G06F 3/067* (2013.01);
(Continued)

(58) Field of Classification Search
CPC .... G06F 9/5016; G06F 9/45558; G06F 3/061; G06F 3/0631; G06F 3/067; G06F 2009/45579; G06F 2009/45583
See application file for complete search history.

(56) References Cited

U.S. PATENT DOCUMENTS

2004/0098537 A1* 5/2004 Serizawa ............ G06F 3/0613
  711/112
2004/0225662 A1* 11/2004 Nojima ................ G06F 3/0605
(Continued)

OTHER PUBLICATIONS

Ahmad, Irfan. "Easy and efficient disk I/O workload characterization in VMware ESX server." Workload Characterization, 2007. IISWC 2007. IEEE 10th International Symposium on. IEEE, 2007. (Year: 2007).*

(Continued)

*Primary Examiner* — Francisco A Grullon
(74) *Attorney, Agent, or Firm* — Mattingly & Malur, PC

(57) ABSTRACT

A management computer communicates with a host computer and a storage device, and is provided with a memory and a CPU. The memory stores configuration information which includes information about a plurality of storage media having different performance levels provided in the host computer and the storage device, and which associates storage regions provided by the storage media with the host computer. If the CPU receives a request for allocation of a storage region to the host computer, and which includes information about access characteristics of the host computer and the capacity of the storage region to be allocated, the CPU refers to the configuration information, selects a storage medium that provides a storage region having the requested capacity, from among the storage media and the host computer, and generates and outputs a configuration scheme for allocating a storage region from the selected storage medium to the host computer.

11 Claims, 11 Drawing Sheets

(51) Int. Cl.
*G06F 3/06* (2006.01)
*G06F 9/455* (2018.01)

(52) U.S. Cl.
CPC .......... *G06F 3/0631* (2013.01); *G06F 3/0665* (2013.01); *G06F 3/0685* (2013.01); *G06F 9/45558* (2013.01); *G06F 2009/45579* (2013.01); *G06F 2009/45583* (2013.01)

(56) References Cited

U.S. PATENT DOCUMENTS

2005/0228963 A1* 10/2005 Rothman .............. G06F 3/0613
711/170
2013/0166570 A1* 6/2013 Takada .................. G06F 3/0605
707/748

OTHER PUBLICATIONS

Gulati, Ajay, Chethan Kumar, and Irfan Ahmad. "Storage workload characterization and consolidation in virtualized environments." Workshop on Virtualization Performance: Analysis, Characterization, and Tools (VPACT). 2009. (Year: 2009).*
Townsend, Josh "Storage Basics—Part VI: Storage Workload Characterization." vmtoday.com. Apr. 8, 2010. (Year: 2010).*
International Search Report of PCT/JP2015/059536 dated May 26, 2015.

* cited by examiner

FIG. 7

| Tenant ID (60) | Sv ID (61) | VM ID (62) | VM Capacity (120) | SvF ID (63) | SvF Total capacity (64) | SvF Allocated capacity (65) |
|---|---|---|---|---|---|---|
| 001 | 001 | 001 | 2000GB | 001 | 2000GB | 1000GB |
|  |  | 002 | 2000GB |  |  | 1000GB |
|  | 002 | 001 | 1000GB | 002 | 2000GB | 700GB |
|  |  | 002 | 500GB |  |  | 300GB |
| 002 | 003 | null | Null | 003 | 1000GB | 1000GB |
|  | 004 | 001 | 2000GB | null | 0GB | 0GB |

| HDD Total Capacity (66) | HDD used Capacity (67) | Read Rate (68) | Required performance (69) |
|---|---|---|---|
| 2000GB | 2000GB | 90% | High |
|  |  | 90% | High |
| 1000GB | 1000GB | 70% | Mid |
|  |  | 50% | Mid |
| 2000GB | 2000GB | 50% | Low |
| 2000GB | 2000GB | 90% | Low |

FIG. 9

| Storage ID | Pool ID | Drive Type | Page ID | VOL ID | VOL LBA | | Pool VOL ID |
|---|---|---|---|---|---|---|---|
| | | | | | Start | End | |
| St1 | Pool 1 | SSD | 0000 | VOL1 | 0 | 0999 | VOL100 |
| | | | 0001 | | 1000 | 1999 | VOL101 |
| | | | 0002 | | 2000 | 2999 | N/A |
| | | | ... | | ... | ... | ... |
| | | | 1000 | VOL3 | 0 | 0999 | VOL53 |
| | | | ... | | ... | ... | ... |
| | | | 2000 | VOL4 | 0 | 0999 | VOL54 |
| | | | ... | | ... | ... | ... |
| | | | 2001 | VOL6 | 0000 | 0999 | VOL55 |
| | | | ... | | ... | ... | ... |
| | ... | ... | ... | ... | ... | ... | ... |
| ... | ... | ... | ... | ... | ... | ... | ... |

90  91  96  92  93  94  95

| VOL ID | Storage ID | Tiering Policy ID |
|---|---|---|
| VOL1 | St1 | TP001 |
| VOL2 | St1 | TP002 |
| ... | ... | ... |

105, 106, 107
100

| Tiering Policy ID | Tier1 rate | Tier2 rate | Tier3 rate |
|---|---|---|---|
| TP001 | 100% | 0% | 0% |
| TP002 | 30% | 30% | 40% |
| TP003 | 0% | 30% | 70% |
| ... | ... | ... | ... |

110, 111, 112, 113
101

F I G. 1 4
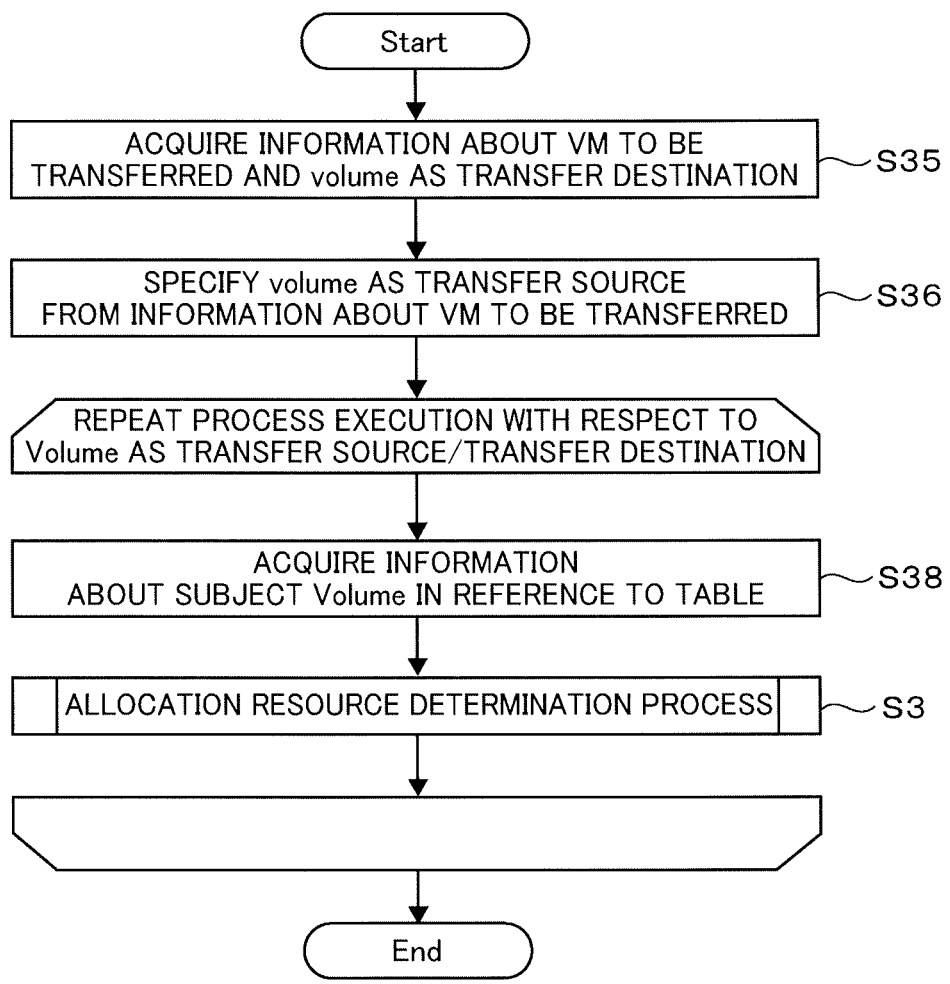

STORAGE MANAGEMENT COMPUTER

TECHNICAL FIELD

The present invention relates to a computer system which includes a storage device. Specifically, the present invention relates to technique for managing storage areas in an environment where the storage media are dispersedly arranged.

BACKGROUND ART

It is important for operation management of the computer system to take characteristics and utilization of the storage medium into account upon allocation of the storage area of the computer system to the host computer for effective use of resources.

PTL 1 discloses the technique for offering the user the information for the search of the storage area based on the operation history of the user upon allocation of the storage area so as to assist management of the storage area of the storage device for allocation to the host computer, and for allocation of the searched volume from the offered information to the host computer.

CITATION LIST

Patent Literature

PTL 1: US Patent Application Publication No. 2013/0166570

SUMMARY OF INVENTION

Technical Problem

Recently, aiming at improvement of the I/O performance of the host computer, a Flash Memory Drive (hereinafter referred to as "server flash") configured to be operated in the host computer has been increasingly utilized.

In general, storage resources of the host computer are managed by the respective host management computers, and those of the storage computer are managed by the storage management computer, individually. As the host management computer and the storage management computer are not configured to share the mutual management information data, it is difficult to perform the allocation while considering utilization of the respective storage areas, and characteristics of the respective storage media.

The server flash exhibits generally high I/O performance in the case of the Random I/O access pattern likewise the operation in the storage device. Meanwhile, the server flash is excellent in the latency performance because of no overhead in data communication compared with the operation in the storage device.

The technique as disclosed in PTL 1 does not take into account the performance characteristics that rely on usage of the storage medium, and resources managed by the host management computer upon allocation of the storage area. Accordingly there still remains room for improvement of the disclosed method of managing the storage resources.

An object of the present invention is to generate the configuration scheme for implementing allocation of the storage area in accordance with the access characteristics of the host computer based on utilization of the storage resources of both the host computer and the storage device.

Solution to Problem

The management computer according to an aspect of the present invention communicates with the host computer and the storage device, and includes a memory and a CPU. The memory stores configuration information which includes information about a plurality of storage media having different performance levels provided in the host computer and the storage device, and which indicates and associates storage areas provided by the storage media with the host computer. If the CPU receives a request which requests allocation of a storage area to the host computer, and which contains information about access characteristics of the host computer and information about the capacity of the storage area to be allocated, then the CPU makes reference to the configuration information, selects a storage medium that can provide a storage area having the requested capacity, from among the storage media provided in the storage device and the host computer and on the basis of the access characteristics included in the request, and generates and outputs a configuration scheme for allocating a storage area from the selected storage medium to the host computer.

Advantageous Effects of Invention

The present invention ensures to generate the configuration scheme for actualizing allocation of the storage area considering utilization of the storage areas of the host computer and the storage device as well as characteristics of the storage media.

BRIEF DESCRIPTION OF DRAWINGS

FIG. 7 shows a server information table according to the first example.

FIG. 9 shows a storage pool table according to the first example.

FIG. 14 is a flowchart representing entire process steps of the resource allocation scheme generation program according to a fifth example.

DESCRIPTION OF EMBODIMENTS

Figure 1:
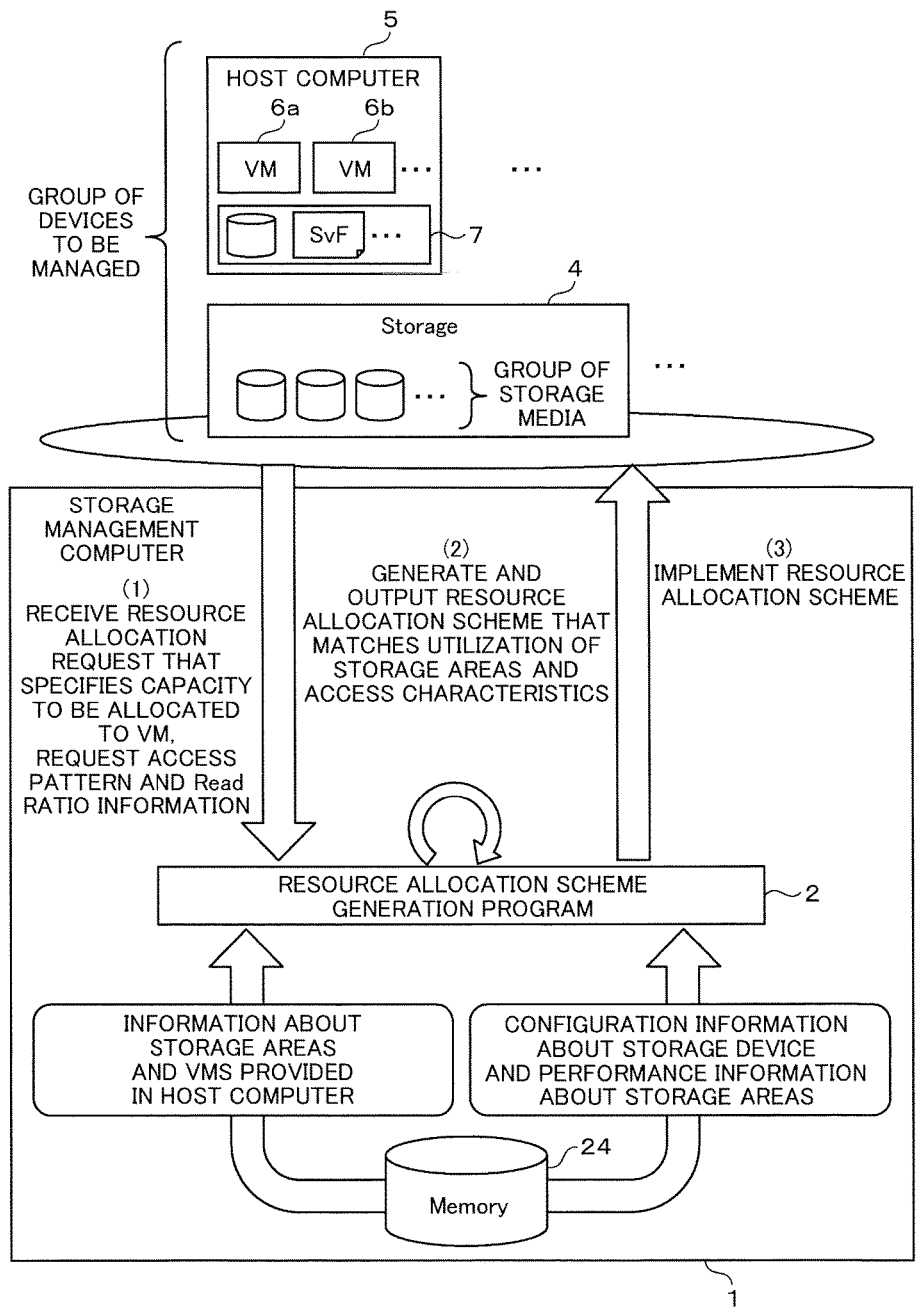
FIG. 1 shows an outline of a first example.

Examples will be described referring to the drawings. The following examples are not intended to restrict the scope of the present invention. It is to be understood that all the elements described in the examples and combinations thereof are not necessarily essential for solution to the problem as described above.

The following description will be made by expressing various types of information data as "aaa table". However, it is possible to express such information as any other data structure except the table. It is also possible to replace the expression "aaa table" with "aaa information" so as to indicate independence from the data structure. The following description simply assumes that the storage management computer, the host computer, and the host management computer execute the respective processes. This means that those processes are executed by the processor (for example, CPU (Central Processing Unit)) of the control device installed in the computer. Likewise, the description of the storage device expressed as being configured to execute the process represents that the process is executed by the controller installed in the storage device. At least one of the control device and the controller may be formed as the processor, or include the hardware circuit for executing a part or all of the processes to be covered by the control device or the controller. The program may be installed in the respective computers or the storage device from the program source. The program source may be the program distribution server or the storage media, for example.

Example 1

FIG. 1 shows an outline of a first example. A Memory 24 of a storage management computer 1 stores information about the storage media installed in the host computer, information about a VM (Virtual Machine) 6, and logical configuration information from the VM to the storage area of a storage device, and performance information. A storage device 4 holds a physical device 52 (storage media group), which stores information about the host computer 5 and the VM 6. The VM 6 runs on the host computer 5, and the physical device 52 stores data of the VM 6.

A resource allocation scheme generation program 2 of the storage management computer 1 receives inputs of capacity of the storage area to be allocated to the host computer 5 or the VM 6, a request access pattern, and Read ratio information (access characteristics). Then based on the performance characteristics derived from the received information, types of the storage media, and layout thereof, the program selects the area corresponding to the access characteristics from the storage areas of the storage device or the host computer, and generates and outputs the resource allocation scheme (configuration scheme). The program executes the process of setting the generated configuration scheme.

Generally, the server flash is the storage resource in the host computer, and managed separately from those in other host computers. Meanwhile, there may often be the case that the storage device is shared by a plurality of host computers. Therefore, the manager of the host computer (host management computer) is generally different from the manager of the storage device.

From the perspective of storage management, it is preferable to allocate the high-performance storage resource installed in the storage computer such as a Flash Memory Drive (hereinafter referred to as "storage flash") preferentially to the workload with more I/Os, or more Read requests for the purpose of improving performance of the entire system. However, as each manager of the host computers is not capable of receiving information about the storage resource status of the system, the manager is likely to issue the storage flash allocation request to the storage manager without considering the entire system balance. The Read request is intensively sent to the allocated server flash, which may cause the storage resources like the storage flash to be allocated to the workload demanding significantly the small number of Read requests to storage, or the workload demanding significantly the small number of I/O requests owing to less Wright request. The storage flash cannot be allocated to the server having no server flash installed. This may cause lack of balance in the allocated resources among the tenants.

The storage management computer according to this example ensures to solve the aforementioned problem by generating the configuration scheme for allocation of the storage area while considering utilization of the storage areas of the host computer and the storage device, and characteristics of the storage media in addition to resource management of the storage device.

Figure 2:
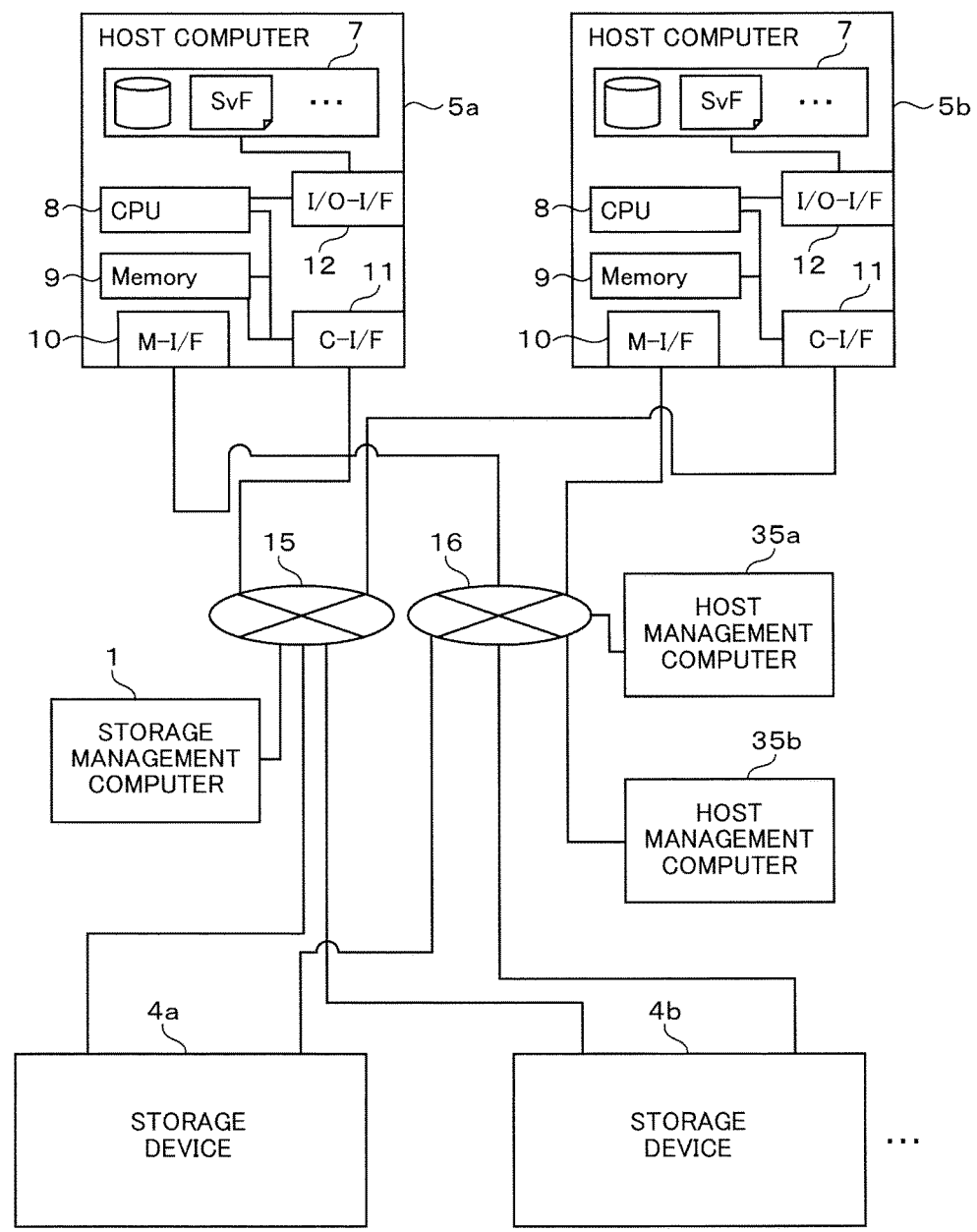
FIG. 2 shows an entire structure of a computer system according to the first example.

FIG. 2 shows an entire structure of the computer system according to the first example.

The computer system according to the embodiment includes the host computer 5 and the storage device 4, which are connected via a data network 15. The computer system further includes a host management computer 35 and the storage management computer 1. The host computer 5, the host management computer 35, the storage management computer 1, and the storage device 4 are connected with one another via a management network 16.

For example, a SAN (Storage Area Network) is employed for the data network 15. It is possible to employ an IP (Internet Protocol) network or any other data communication network. For example, the IP network is employed for the management network 16. It is possible to employ the SAN or any other data communication network. The same networks may be employed for the data network 15 and the management network 16. The same computers may be employed for the host computer 5, the host management computer 35, and the storage management computer 1.

The host computer 5 includes a control device such as the storage media group 7, and a CPU (Central Processing Unit) 8, the storage device such as a Memory 9, an M-I/F (Management-Interface) 10, a C-I/F (Communication-interface) 11, and an I/O-I/F (I/O-Interface) 12. The host computer 5 may be provided with an input/output device (keyboard, display device and the like). The CPU 8 executes the program stored in the Memory 9. In the following description, the component called CPU is assumed to execute the program stored in the Memory connected to the CPU. The M-I/F 10 is the interface with the management network 16, and configured to perform transmission/reception of data and control instruction to/from the storage device 4, the host management computer 35, and the storage management computer 1. The C-I/F 11 is the interface with the data network 15, and configured to perform transmission/reception of data and control instruction to/from the storage device 4. The I/O-I/F is the interface with the storage media group 7, and configured to perform transmission/reception of data and control instruction to/from the storage media group 7.

Referring to an example shown in FIG. 2, the system includes two host computers 5, two storage devices 4, two host management computers 35, and one storage management computer 1, which is not limited to the above-described structure. In this embodiment, a host management computer 35a is configured to mainly manage the server flash of a host computer 5a, and a host management computer 35b is configured to mainly manage the server flash of a host computer 5b, which are not limited to the above-described structure. The host computer 5 may be configured to execute the process of the host management computer 35 so that the process executed by the host management computer 35 may be read to be executed by the host computer 5 in an analogous manner. The data network 15 is allowed to have switches such as a FC (Fibre Channel) switch that is allowed to perform transmission/reception of data and control instruction to/from the C-I/F 11 of the host computer 5 and D-I/F 51 of the storage device 4, respectively.

Figure 3:
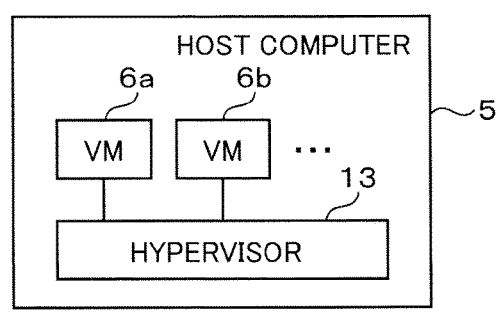
FIG. 3 is a conceptual view of a host computer according to the first example.

FIG. 3 shows a logical layout of the host computer 5. The host computer 5 includes a Hypervisor 13 (hereinafter referred to as "HV") capable of logically generating and implementing the VM 6. The HV 13 is allowed to collectively control the plurality of VMs 6. Each of the VMs 6 is capable of executing the application like the standalone physical computer.

Figure 4:
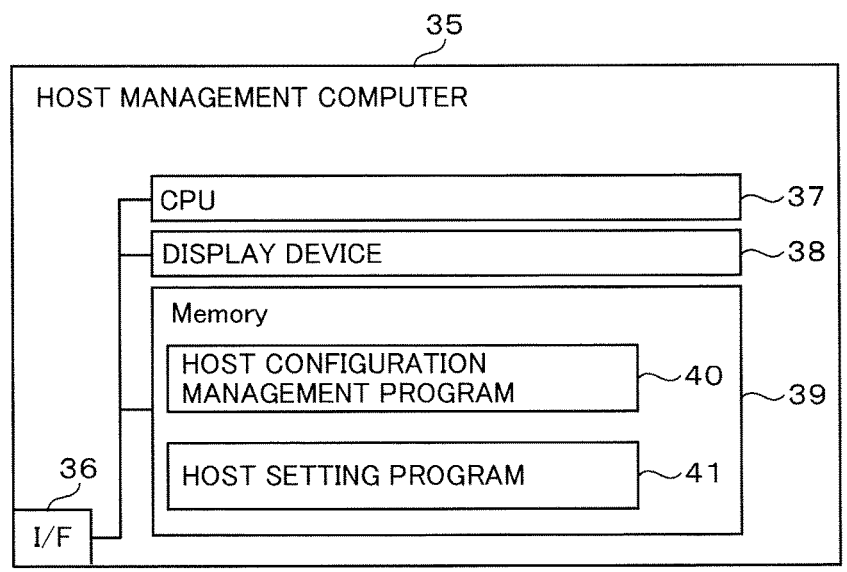
FIG. 4 shows a host management computer according to the first example.

FIG. 4 illustrates the host management computer 35. The host management computer 35 includes a CPU 37, a display device 38 (display unit) such as an LCD (Liquid Crystal Display), a Memory 39, and an I/F 36. The host management computer 35 may be provided with the input device (keyboard and the like). The I/F 36 serves as the interface with the management network 16 for transmission/reception of data and control instruction to/from the storage device 4, the host computer 5, and the storage management computer 1, respectively. The Memory 39 stores a host configuration management program 40 and a host setting program 41. The host configuration management program 40 manages the configuration information about the storage media group 7 including the server flash of the respective host computers 5. The host configuration management program 40 communicates with a host information acquisition program 25 of the storage management computer 1 which will be described later for transmission/reception of various types of information data. The host setting program 41 executes various settings of the storage media group 7 including the server flash of the host computer 5. The various settings include those for setting the use of the server flash as cache, and allocation of arbitrary capacity of the server flash to the VM.

Figure 5:
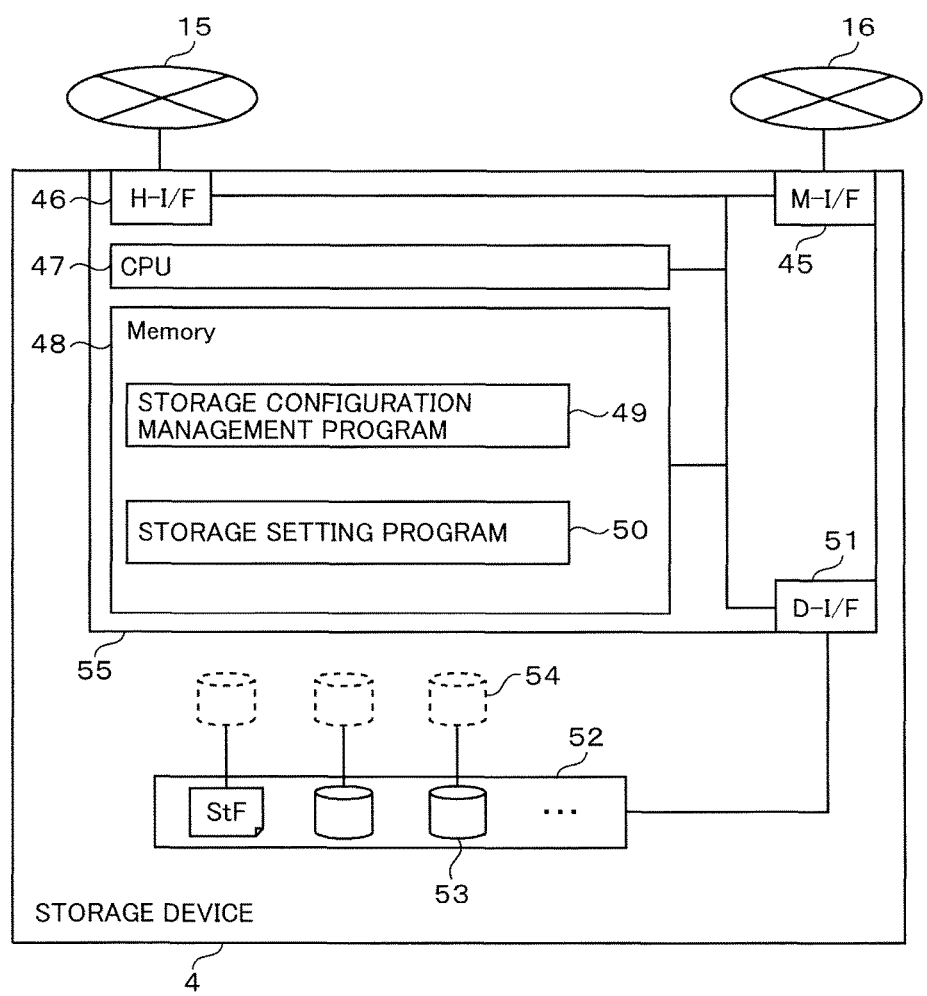
FIG. 5 shows a storage device according to the first example.

FIG. 5 illustrates a structure of the storage device 4. The storage device 4 includes a disk controller 55 and a physical device 52. The disk controller 52 includes a CPU 47, a Memory 48, an M-I/F 45, an H-I/F (Host-Interface) 46 as the storage port, and a D-I/F (Disk-Interface) 51. The M-I/F 45 serves as the interface with the management network 16 for transmission/reception of data and control instruction to/from the host computer 5, the host management computer 35, and the storage management computer 1, respectively. The H-I/F 46 serves as the interface with the data network 15 for transmission/reception of data and control instruction to/from the host computer 5. The D-I/F 51 transmits/receives data and control instruction to/from the physical device 52.

The physical device 52 is constituted by a plurality of types of physical storage media 53, for example, HDD (Hard disk Drive), and the Flash Memory Drive (storage flash, StF). In this example, the HDD refers to the physical storage media other than the Flash media. The storage device 4 generates a logical volume 54 from the storage area of the plurality of physical storage media 53 in the physical device 52. The plurality of logical volumes 54 may be generated in the storage device 4.

The logical volume 54 may be Thin Provisioning volume in the form which allows dynamic expansion of the capacity. The Thin Provisioning as technology for effective use of the storage area enables a part of the physical storage area (hereinafter referred to as "page") to be allocated to the physical volume for dynamic expansion of the storage area. The logical volume 54 provides the page for allocation to the Thin Provisioning volume. Upon reception of I/O from the host computer 5, the page is allocated to the Thin Provisioning volume from the logical volume 54 included in the pool. This makes it possible to dynamically expand the capacity of the Thin Provisioning volume.

The Memory 48 stores a storage configuration management program 49 and a storage setting program 50. The storage configuration management program 49 manages the configuration information about the storage device 4. The storage configuration management program 49 communicates with a storage information acquisition program 27 of the storage management computer 1 for transmission/reception of various information data, which will be described later. The storage setting program 50 executes various settings of the storage device 4. The various settings include those for improving performance of access to the host computer 5, for example, obtaining the cache area which temporarily stores data for reading and writing for the logical volume 54, and securing the processor which executes the process of reading and writing for the logical volume 54.

Figure 6:
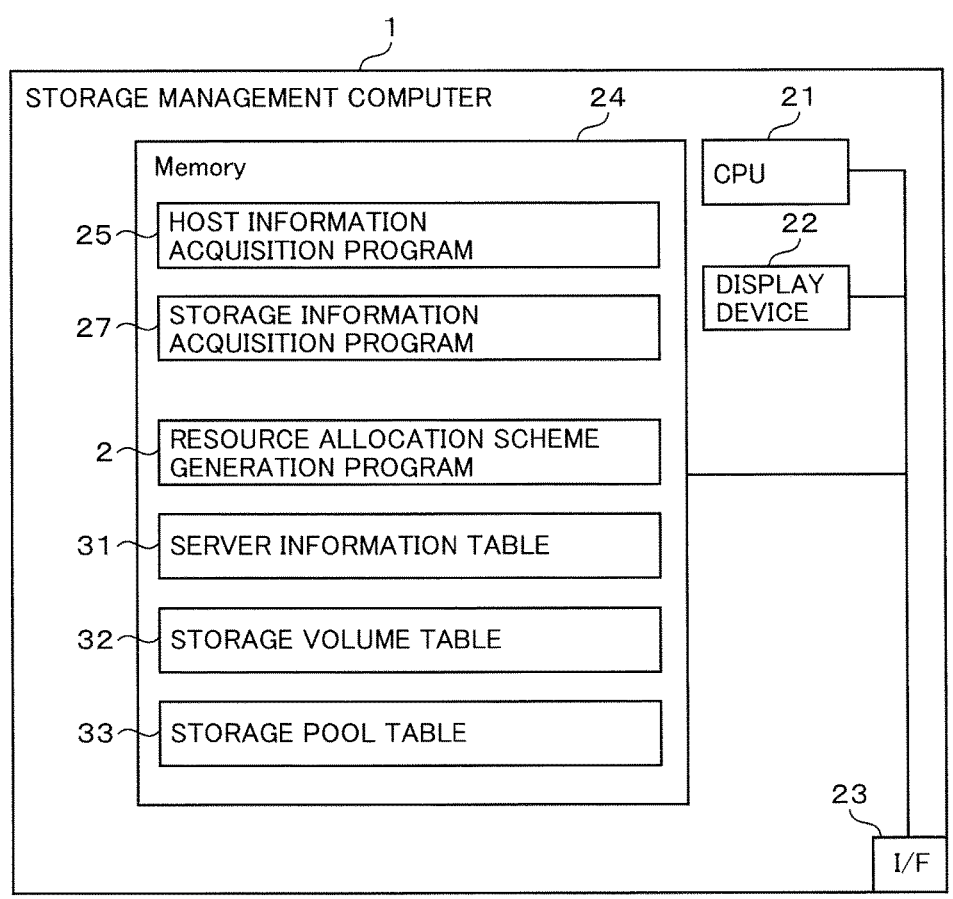
FIG. 6 shows a storage management computer according to the first example.

FIG. 6 illustrates a structure of the storage management computer 1. The storage management computer 1 includes a CPU 21, a display device 22 (display unit) such as the LCD, the Memory 24, and an I/F 23. The storage management computer may be provided with the input device (keyboard and the like). The I/F 23 serves as the interface with the management network 16 for transmission/reception of data and control instruction to/from the storage device 4, the host computer 5, and the host management computer 35, respectively. The Memory 24 stores the program including the host information acquisition program 25, the storage information acquisition program 27, and the resource allocation scheme generation program 2. Furthermore, the Memory 24 stores the information table including a server information table 31, a storage volume table 32, and a storage pool table 33.

For convenience, the expression "storage management computer 1" is used in the example. However, the device to be managed by the computer is not limited to the storage device.

FIG. 7 shows the server information table 31. This table is used for managing the information about the host computer 5. The server information table 31 includes such information as a tenant ID 60 indicating the tenant to which the host computer belongs, an Sv ID 61 indicating the host computer, a VM ID 62 indicating the VM which runs on the host computer, a VM capacity 120 indicating the total capacity of the VMs, an SvF ID 63 indicating the server flash of the host computer, an SvF Total Capacity 64 indicating the total capacity of the server flash, an SvF Allocated Capacity 65 indicating the allocated capacity of the server flash, an HDD Total Capacity 66 indicating the total capacity of the hard disk built in the host computer, an HDD Used Capacity 67 indicating the used capacity of the hard disk, a Read Rate 68 indicating a Read I/O ratio of workloads of the host computer and the VM, and a Required Performance 69 indicating the required performance of the workloads of the host computer and the VM. The tenant refers to the logical group of the host computers. The VM and the application may be transferred between the host computers which belong to the same tenant.

This table specifies the correlation between the respective resources. There may be the case that the VM ID 62 stores "null" as information indicating that the subject host computer does not operate the VM. Likewise, the SvF ID 63 may also store "null" as the information indicating that the server flash is not installed in the subject host computer. There may be the case that the Required Performance 69 stores "High" as the information indicating that required performance of the workloads of the subject host computer and the VM is high. For example, the Performance 69 may store "null" as the information indicating that the required performance has not been set.

Figure 8:
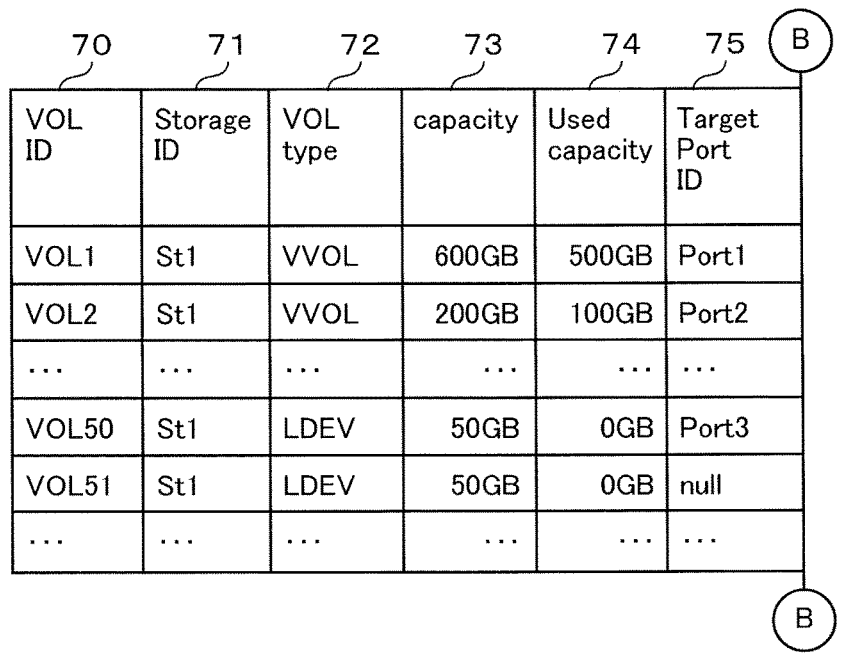
FIG. 8 shows a storage volume table according to the first example.
Figure 8:
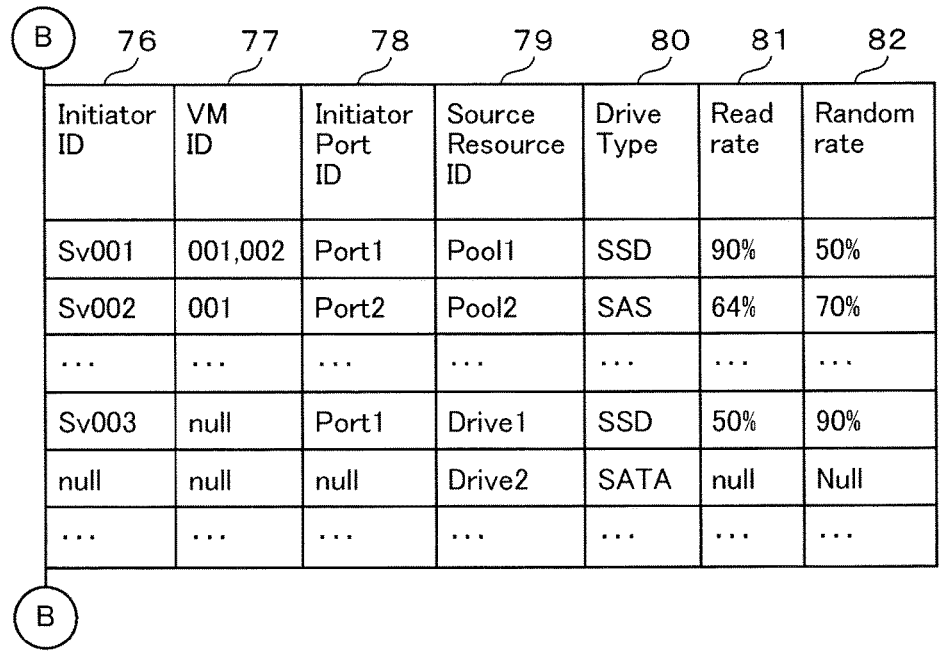

FIG. 8 shows the storage volume table 32. This table is used for managing the information about the logical volume 54 of the storage device 4. The storage volume table 32 includes a VOL ID 70 indicating the logical volume, a Storage ID 71 indicating the storage device for providing the logical volume, a VOL type 72 indicating the logical volume type, a Capacity 73 indicating the total capacity of the logical volume, a Used Capacity 74 indicating the used capacity of the logical volume, a Target Port ID 75 indicating a target port of the storage device to which the logical volume is allocated, an Initiator ID 76 having an initiator port to which the logical volume is allocated, a VM ID 77 indicating the VM to which the logical volume is allocated, an Initiator Port ID 78 indicating the initiator port to which the logical volume is allocated, a Source Resource ID 79 indicating the resource, based on which the logical volume is constituted, a Drive Type 80 indicating the type of the physical storage medium of the logical volume, a Read rate 81 indicating a Read I/O ratio with respect to the logical volume, and Random rate 82 indicating a Random I/O ratio with respect to the logical volume.

In the example, the "VVOL" stored in the VOL type 72 refers to the Thin Provisioning volume, which is constituted by the pool volume derived from the storage pool. The Source Resource ID 79 indicates the ID of the pool managed by the storage pool table 33 to be described later. Meanwhile, "LDEV" stored in the VOL type 72 refers to storage of the physical storage medium ID of the separately managed storage device in the Source Resource ID 79. It is possible to use the volume directly provided to the host computer as the storage area for the logical volume having the physical storage medium information stored in the ID 79. The logical volume may be managed as the pool volume by the storage pool table 33 to be described later for provision to the Thin Provisioning volume.

This table specifies correlation between the resources. The initiator ID 76 stores an identifier of the host computer indicated by the Sv ID 61 of the server information table 31. The Drive Type 80 may store an "SSD" as the information indicating, for example, the type of the physical storage medium constituting the logical volume. In the case where the logical volume is not allocated to the Target Port and the Initiator Port, "null" is stored in the Target Port ID 75, the Initiator ID 76, the VM ID 77, and the Initiator Port ID 78. In the first example, the Read rate 81 and the Random rate 82 do not have to be stored.

FIG. 9 shows the storage pool table 33. This table is used for managing the information about the pool constituting the Thin Provisioning volume as a logical volume form of the storage device 4. The storage pool table 33 represents the correlation between the logical volume and the one constituting the pool.

Specifically, the storage pool table 33 is the information as described below. A storage ID 90 is the information for identifying the storage device 4 having the pool. A pool ID 91 is the information for identifying the pool. A Drive Type 96 is the information indicating the type of the physical storage medium constituting the pool. A Page ID 92 is the information for identifying the page belonging to the pool.

A VOL ID 93 is the information for identifying the VOL having the page. A VOL LBA 94 is the information indicating the page position in the VOL (for example, LBA at the start of the page, and LBA at the end of the page). A Pool VOL ID 95 is the information for identifying the logical volume 54 having the storage area to which the page is assigned. The term "N/A (Not/Assigned)" indicates that the page is not assigned to any of the storage area.

The server information table 31, the storage volume table 32, and the storage pool table 33 may be collectively or partially referred to as "configuration information" of the computer system.

Operations of the storage management computer 1 will be described in detail. Processing of the host information acquisition program 25 will be described first. The host information acquisition program 25 acquires configuration/performance information of the host computer 5 from the host configuration management program 40 of the host management computer 35, and stores the acquired information in the server information table 31 and the like. Specifically, the host information acquisition program 25 stores the configuration/performance information of the respective host computers 5 and the configuration information of the VM 6 in the server information table 31. The host information acquisition program 25 may be configured to execute the aforementioned processing periodically, or in accordance with the operation by the user.

The storage information acquisition program 27 acquires the configuration information of the storage device 4 from the storage configuration management program 49 of the storage device 4. Based on the acquired configuration information, the processing for updating the storage volume table 32 and the storage pool table 33 is executed. As for the storage volume table 32, the storage information acquisition program 27 stores the acquired configuration information of the storage device 4 in association with the information about the VM 6 with the common identifier of the host computer (Initiator ID 76, Sv ID 61), which is stored in the server information table 31. The storage information acquisition program 27 may be configured to execute the processing periodically, or in accordance with the operation by the user.

Processing of the resource allocation scheme generation program 2 will be described. The resource allocation scheme generation program 2 receives the request information about the resource allocation notified through input from the user. Based on the received information, and the information data stored in the server information table 31, the storage volume table 32, and the storage pool table 33, the resource allocation scheme is generated while having the type and layout of the physical storage media considered.

An outline of the resource allocation process will be explained. The resource allocation scheme generation program 2 receives inputs of the user, which include identifiers of the host computer and the VM to which the resource is allocated, the capacity of the storage area (or logical volume) to be allocated, information about the access pattern issued (accessed) by the VM (or the host computer) to the allocation storage area, and designation of the information about I/O Read ratio (S1). If the VM is not the one to which the capacity is allocated, the identifier of the host computer is only designated. The VM or the host computer to which the resource is allocated may be collectively referred to as "VM and the like".

The I/O access pattern refers to the ratio between the sequential access and the random access. If the sequential access is dominant, "Sequential" is designated. If the random access is dominant, "Random" is designated. If each access ratio of the sequential and random is substantially the same, "Balanced" is designated. Preferably, the user determines and designates the access pattern based on characteristics of the application which runs on the VM and the like. The aforementioned information will be referred to as "request access pattern" hereinafter. If data reading is mainly executed by the application which runs on the VM and the like, "Read" is designated. If the data writing is mainly executed, "Write" is designated. If each ratio of reading and writing is substantially the same, "Balanced" is designated. The aforementioned information will be referred to as "request I/O type".

For example, the user may input "Allocation of 1000 GB storage area to the VM ID 002 on the host computer as Sv ID 001 is requested. The request access pattern from the VM is "Random", and the request I/O type is "Read"". The input of the user may be received through the input device such as the keyboard and the mouse, and the display device 22. The input may be received through the other program or arbitrary reception method.

In reference to the tables 31 to 33, the resource allocation scheme generation program 2 acquires the information about the host computer 5 and the storage device 4 (S2). Based on the information acquired in S1, S2, the allocation resource is determined (S3), and the process ends. The resource to be allocated may be selected from the option including allocation of the logical volume for providing HDD 500 GB from the storage area of the storage device "St1", and further allocation of the server flash 500 GB as the cache. Alternatively, it will be selected from the option including allocation of the logical volume for providing the storage flash 500 GB of the storage device "St1", or allocation of only the HDD 100 GB of the host computer.

Adequacy as to which performance of the storage media, and as to which resource to be selected from the host computer or the storage from the perspective view of latency depends on the access pattern and the Read ratio of the application which runs on the VM and the like. The allocation is determined while considering the aforementioned condition and utilization of the resource. For example, if the request access pattern is "Sequential", the HDD is preferentially selected as the storage medium for allocation to the Flash medium. Furthermore, the HDD of the host computer, excellent in the latency performance is preferentially allocated to that of the storage device. If the request I/O type is "Read", it is preferable to allocate the server flash. If the request access pattern is "Balanced", the priority is made lower than the "Random" so that the allocation is made only in the case of sufficient capacity of the server flash. The HDD may be selected for the resource of the storage device.

Those conditions are judged in a complex manner. The judgment criterion according to this example will be described in detail referring to FIG. 10. Both or one of the access pattern and I/O type may be referred to as "access characteristic".

The configuration scheme according to the example is generated on the assumption that the storage area of the storage device is provided to the host computer as the Thin Provisioning volume. It is possible to generate the configuration scheme for allocation of any other logical volume and storage area. In the above-described case, the capacity allocation request input by the user may include the volume type designation.

Figure 10:
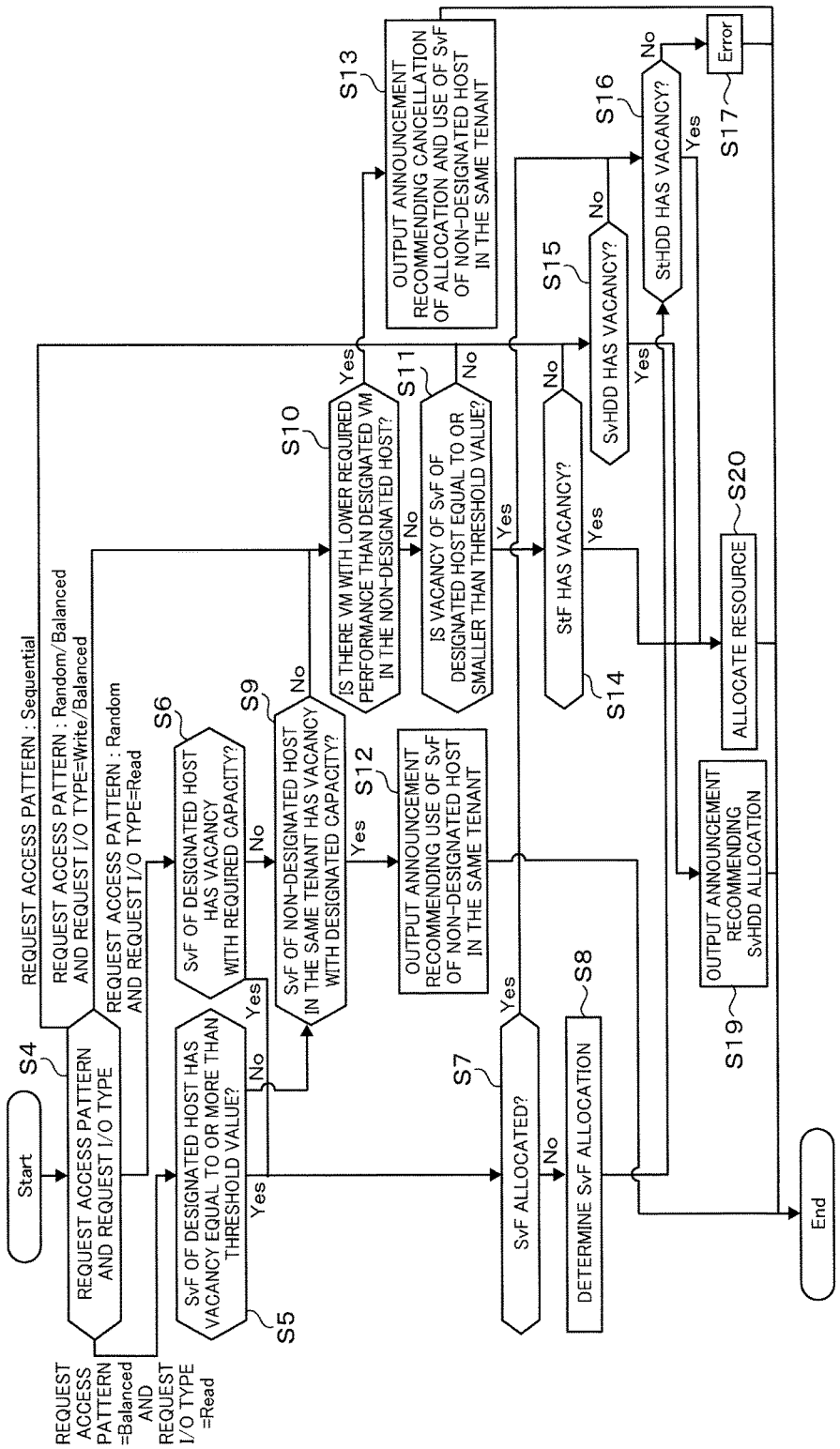
FIG. 10 is a flowchart representing process steps of determining allocation resource in a resource allocation scheme generation program according to the first example.

FIG. 10 represents the allocation resource determination process (S3) in detail. In accordance with the request access pattern, the request I/O type, utilization of the system resource, and the resource allocated to the designated VM and the like, the resource allocation generation program 2 determines the resource to be allocated to the designated VM and the like.

The resource allocation scheme generation program 2 determines the request access pattern and the request I/O type, inputs of which have been received (S4). If it is judged in S4 that the request access pattern is Balanced and the request I/O type is Read, the server information table 31 is referred to judge whether or not the server flash of the host computer on which the designated VM runs has the vacant capacity equal to the threshold value A or more (S5). The threshold value A in S5 refers to the information for management of the vacant capacity to be kept, which will be used in the following formula.

Threshold value $A$=(Total capacity of $SvF$ of the designated host computer)*50%+capacity designated by user In accordance with the exemplary formula, if more than 50% of the total capacity of the server flash remains, it is determined that allocation is allowed. The value of 50% is preliminarily set. However, such value may be changed in accordance with utilization policy of the user. In this case, the determination is made based on the following policy. That is, the request access pattern is Balanced, which is not specifically suitable for server flash allocation. However, the allocation is allowed in the case of sufficient vacant capacity of the server flash because the I/O type is Read, which is suitable for the server flash allocation in terms of the I/O type.

If Yes in S5, it is judged whether or not the server flash has been already allocated to the designated VM to which the capacity is allocated (S7). If Yes in S7, the server flash allocation to the other VM and the like is prioritized. It is determined that the storage area of the storage device is only additionally allocated to the subject VM. In the case of large Read ratio, the HDD may be selected as the resource of the storage device for allocation instead of high performance storage flash. In reference to the storage pool table 33, it is judged whether or not there is the storage device having the HDD pool with vacant capacity equal to the designated value or more (S16). In reference to the storage pool table 33, it is judged with respect to the capacity of the Drive Type 96 serving as the disk medium, for example, SATA and SAS rather than the SSD.

Specifically, the resource allocation scheme generation program 2 makes reference to the storage pool table 33 to search the pool constituted by the storage media of Drive Type indicating the HDD. The total capacity of the page having Pool VOL ID set to "N/A" is calculated as the vacant capacity for each of the searched pools.

If the judgement result in S16 is Yes, the resource allocation scheme for allocation of the HDD is generated. The pool volume is provided from the HDD pool to the storage setting program 50 of the storage device 4 to constitute the Thin Provisioning volume. The instruction is issued to allocate the volume to the request VM and the like (S20), and the process ends. It is also possible to output the resource allocation scheme (configuration scheme) to the display device 22 instead of issuing the allocation instruction. Alternatively, the allocation instruction may be issued to the storage device 4 upon reception of implementation request of the output configuration scheme. This applies to the case that the process reaches the step S20 via the other process steps of the flow.

If judgment result in S16 is No, the error is output, indicating that the resource cannot be allocated, and the process ends (S17). In S17, the same process is executed regardless of the process flow passing through other steps.

If the result in S7 is No, allocation of the designated capacity from the server flash of the designated host computer is determined (S8), and the process proceeds to S16. Referring to the storage pool table 33, it is determined whether the HDD of the storage device 4 has the vacant capacity designated for allocation (S16). Likewise the determination which has been made as described above, if there is the vacant capacity, the resource allocation scheme for allocation of the storage area from the HDD pool is generated. The allocation of the logical volume using the storage area is issued to the storage setting program 50 of the storage device 4. The instruction for allocation of the logical volume using the storage area is further issued to the storage setting program 50 of the storage device 4. The instruction for setting the server flash as the cache with the designated logical volume is issued to the host setting program 41 of the host management computer 35. The process then ends (S20).

If the result in S5 is No, in reference to the server information table 31, it is judged whether or not there is the host computer having the server flash with vacant capacity equal to the designated value or more in the same tenant as that of the designated host computer (S9). The judgement in S9 may be made based on such criterion as the threshold value A or larger in the similar way to S5 instead of the designated capacity or more. If the result in S9 is Yes, the announcement recommending usage of the server flash is output by operating the VM which has received the capacity allocation request by way of the host computer searched in S9 instead of the designated host computer. The process then ends (S12). If the host computer is subjected to the capacity allocation rather than the VM, it is possible to output the announcement recommending that the application expected to use the data stored in the allocated storage area is operated by the host computer searched in S9. In S12, the announcement may be output to the user via the display device 22. Alternatively, the announcement may be sent to the other program, or whatsoever the process may be.

If the result in S9 is No, it is judged whether or not there is the VM and the like with the request performance lower than the VM designated by the user in the same tenant (S10). The determination is made by searching the Required performance 69 of the server information table 31.

If the result in S10 is Yes, and the server flash has been allocated to the subject VM (or host computer), the announcement is output, recommending cancellation of the allocation, and allocation of the server flash by operating the VM to which the capacity allocation is requested on the host computer having the VM searched in S10 running instead of the designated host computer. The process then ends (S13). If the host computer is the one to which the capacity is allocated instead of the VM, it is possible to output the announcement recommending operation of the application expected to use the data stored in the allocated storage area on the host computer searched in S10.

If the result in S10 is No, it is determined whether or not the server flash of the designated host computer 5 has the vacant capacity equal to or more than the threshold value B (S11). The threshold value B in S11 refers to the information for controlling preferential allocation of the storage flash if the vacant capacity of the server flash of the designated host computer is smaller than that of the server flash of the other host computer. For example, if the request access pattern is Random, such value is derived from the following formula.

Threshold value B=(total vacant capacity of SvF installed in the host computer other than the designated one in the tenant)/(the number of host computers other than the designated one)

In the example as expressed by the formula, if the vacant capacity of the server flash of the designated host computer is smaller than the average value of the vacant capacity of the server flash of the host computers other than the designated one in the tenant, the process proceeds to step for judging allocation of the storage flash. In S1, it is possible to allocate the storage flash preferentially to the host computer having the server flash with insufficient capacity.

If the request access pattern is Balanced, the threshold value B is set to the lower value compared with the case that the request access pattern is Random. For example, it is possible to set the threshold value in the case of Balanced access pattern to be 50% of the threshold value in the case of the Random access pattern, or any other value arbitrarily. This makes it possible to change such value in accordance with the usage policy of the user. In the case of the Balanced request access pattern, the threshold value B is set to be lower than the value in the case of the Random request access pattern. This makes it possible to allocate the storage flash preferentially to the I/O with the Random access pattern.

If the result in S11 is Yes, it is judged whether or not there is the vacant capacity equal to or more than the request capacity in the storage area of the Flash medium of the storage device 4 (S14). Likewise the case in S16, the determination is made in S14 by calculating the vacant capacity of the Flash medium pool such as the SSD in reference to the storage pool table 33. If the result in S14 is Yes, the resource allocation scheme for allocating the storage area is generated. The instruction is issued to the storage setting program 50 of the storage device 4 for allocating the logical volume using the subject storage area. The process then ends (S20). If the result in S11 or in S14 is No, it is judged whether or not the HDD in the designated host computer has the vacant capacity equal to or more than the designated capacity (S15). If the result in S15 is Yes, the announcement recommending the use of the HDD of the subject host computer is output, and the process ends (S19). If the result in S15 is No, the process proceeds to S16 where it is determined whether or not allocation to the HDD of the storage device 4 is executable.

If the result in S4 shows Sequential request access pattern, the HDD is set as the storage medium for allocation in preference to the Flash medium. The process proceeds to S15 for allocating the HDD of the host computer with excellent latency performance in preference to the HDD of the storage device.

If the result in S4 is Random or Balanced request access pattern, and Write or Balanced request I/O type, the process proceeds to S10. The common process will be executed as described above in S10 and subsequent steps. If the result in S4 shows the Random request access pattern, and Read request I/O type, it is judged whether or not the server flash in the designated host computer has the vacant capacity equal to or more than the designated value (S6). In the case of Random request access pattern, the server flash is preferentially allocated. Therefore, unlike the process in S5, securing the vacant capacity equal to or more than the capacity designated by the user is not taken into account. It is also possible to regard the threshold value A as being equal to the capacity designated by the user. If the result in S6 is Yes, the process proceeds to S7. If the result in S6 is No, the process proceeds to S9.

The allocation resource determination process (S3) executed by the resource allocation scheme generation program 2 has been described. The policy on the branch of the flow is not limited to the explanation as described above. For example, upon determination with respect to cancellation of the server flash allocation from the other VM and the like, it is possible to output the configuration scheme for cancelling the allocation from the VM with lower priority of the server flash allocation in reference to the server information table 31 and the storage volume table 32.

Specifically, in the case of "Random" request access pattern and "Read" request I/O type of the VM which has received the allocation request, the determination may be made to recommend allocation to the VM with allocation request by canceling the server flash allocation from the VM with Read ratio set to "Balanced" and "Write". Assuming that the Read ratio ranging from 40 to 70% is defined as "Balanced", the Read ratio of the VM 001 as the Sv 002 becomes "Balanced" as FIG. 8 shows. If further capacity allocation request is issued to the preferential VM, it is determined that the server flash allocation can be canceled, and the configuration scheme is output.

Concerning the vacant capacity of the storage area of the storage device, the total page capacity having no pool volume set in the corresponding pool is calculated. The storage medium does not have to be secured for the Thin Provisioning volume to be allocated from the time for allocation to the host computer. For example, if the threshold value equal to or more than the actual capacity is set for each pool, so long as the capacity is within the threshold value, it is possible to generate the configuration scheme for allocating the storage area to the host computer from the pool in spite of the capacity which exceeds that of the physical storage medium of the pool.

After completion of implementing the resource allocation scheme, the storage management computer 1 updates the information in the tables 31 to 33 in response to the setting completion notice from the host computer 2 and the storage device 4 or acquisition of the information on the regular basis.

The first example allows the configuration in which a plurality of host computers using the server flash share the storage device to generate the configuration scheme that matches the performance characteristics based on the type and layout location of the physical storage media, and instruct implementation of the generated configuration scheme. This makes it possible to improve the I/O performance of the entire computer system.

Example 2

A second embodiment will be described. In the following description, the structure different from the one described in the first embodiment will be especially explained, and explanation of the structure similar to the one described in the first embodiment will be omitted. In the first embodiment, the resource allocation scheme generation program 2 of the storage management computer 1 generates the allocation scheme of the logical volume 54 of the storage device 4 and the storage media group 7 including the server flash of the host computer 5. Meanwhile, in the embodiment, the storage management computer 1 generates the resource allocation scheme with respect to Dynamic Thin Provisioning volume 54a. The Dynamic Thin Provisioning volume is a form of the logical volume 54 of the storage device 4. Likewise the Thin Provisioning volume, it is the logical volume capable of dynamically expanding the capacity. Subsequent to allocation of the page to the Dynamic Thin Provisioning volume 54a, such page may be dynamically changed to another page with different response and reliability in accordance with the access status to the Dynamic Thin Provisioning volume 54a.

In the second embodiment, a volume Tiering Policy setting table 100 and a Tiering Policy table 101 are additionally stored in the Memory 24 of the storage management computer 1. In the second embodiment, the process of the resource allocation scheme generation program 2 of the storage management computer 1 is partially changed. The different feature as described above will be explained hereinafter.

Figures 11, 12, 13:
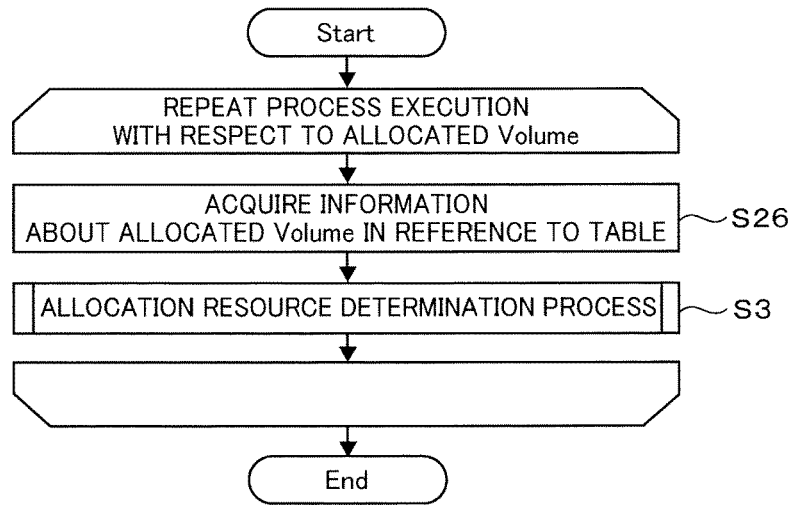
FIG. 11 shows a volume Tiering Policy setting table according to a second example.
FIG. 12 shows a Tiering Policy table according to the second example.
FIG. 13 is a flowchart representing entire process steps of the resource allocation scheme generation program according to a third example.

FIG. 11 shows the volume Tiering Policy setting table 100 stored in the Memory 24 of the storage management computer 1 according to the second embodiment. The volume Tiering Policy setting table 10 is used for managing the information about Tiering Policy set in the Dynamic Thin Provisioning volume 54a. The volume Tiering Policy setting table 100 represents correlation between the Dynamic Thin Provisioning volume 54a and the Tiering Policy set in the volume. The Tiering Policy refers to the information which defines the rule for the Dynamic Thin Provisioning volume 54a to execute the page allocation, and change in the page allocation.

Specifically, the volume Tiering Policy setting table 100 includes the following information. A VOL ID 105 is the information for identifying the Dynamic Thin Provisioning volume 54a. A Storage ID 106 is the information for identifying the storage device 4 having the volume 54a. A Tiering Policy ID 107 is the information for identifying the Tiering Policy set in the volume 54a.

FIG. 12 shows the Tiering Policy table 101 which is stored in the Memory 24 of the storage management computer 1 according to the second embodiment. The Tiering Policy table 101 is used for managing the Tiering Policy information. The Tiering Policy table 101 defines the rule for the page allocation and change in the allocation, which are specified by the Tiering Policy.

Specifically, the Tiering Policy table 101 includes the following information. A Tiering Policy ID 110 is the information for identifying the Tiering Policy. A Tier1 rate 111 refers to a rate of the storage area of the available Tier1 to the total capacity of the volume of the Dynamic Thin Provisioning volume 54a in which the Tiering Policy is set. For example, if the total capacity of the subject volume 54a indicated by the capacity 73 of the storage volume table 32 is 100 GB, and the Tier1 rate 111 is 30%, 30 GB is the available capacity of the storage area of the Tier 1 for the Dynamic Thin Provisioning volume 54a.

The term "Tier 1" refers to the information which specifies the type (performance range) of the physical storage medium constituting the volume 54a. It is possible to define the Drive Type 80 in the storage volume table 32 as SSD, or make the correlation with any other type of physical storage medium. Likewise, each of Tier2 rate 112 and Tier3 rate 113 refers to the rate of the available Tier2, Tier3, respectively to the total capacity of the volume of the Dynamic Thin Provisioning volume 54a in which the Tiering Policy is set.

Restriction of the rate of the available storage area to the volume 54a for each physical storage medium of a plurality of types allows preferential allocation of the physical storage medium that matches the use of the volume 54a. The Tiering Policy ID 107 is stored in the Tiering Policy ID 107 of the Tiering Policy setting table 100 so as to allow judgement of the Tiering Policy set in the volume 54a.

Referring to an example shown in FIG. 12, each priority of the respective Tiers to be used is preliminarily defined so that the Tier with higher priority is allocated to the data with larger number of I/Os in order. If the page is assigned by the amount corresponding to the available Tier, the Tier page with the next higher priority is assigned. In place of the example shown in FIG. 12, the Tiering Policy may be determined by defining the Tier to be allocated to the specific I/O number and range of I/O number, or arbitrary method.

In the first embodiment, the pool is constituted by the single type of storage media. The storage table 33 according to the second embodiment is allowed to store "Mix" indicating that the pool is constituted by a plurality of types of physical storage media as the Drive Type 96. Likewise, the Drive Type 80 of the storage volume table 32 allows storage of "Mix" in the column for the Dynamic Thin Provisioning volume.

The information obtained by adding the volume Tiering Policy setting table 100 and the Tiering Policy table 101 to the tables 31 to 33 may be entirely or partially referred to as "configuration information".

An allocation resource determination process S3a executed by a resource allocation scheme generation program 2a according to the second embodiment will be described. The allocation resource determination process S3a has the process step different from S20 of the allocation resource determination process S3 according to the first embodiment. The rest of the process steps are the same as those described in the first embodiment.

The allocation resource determination process S3a generates the resource allocation scheme for allocating the Dynamic Thin Provisioning volume 54a which sets the Tiering Policy (TP001 of the example as shown in FIG. 12) with high rate of the Flash media subsequent to S14. The generated resource allocation scheme (configuration scheme) is output to the display device 22, or an instruction for allocating the Dynamic Thin Provisioning volume 54a is issued to the storage setting program 50 of the storage device 4. The process then ends (S21).

Subsequent to S16, the allocation resource determination process S3a generates the resource allocation scheme for allocating the Dynamic Thin Provisioning volume 54a which sets the Tiering Policy (TP003 of the example as shown in FIG. 12) with no Flash media allocated. The generated resource allocation scheme is output to the display device 22. Alternatively, the allocation of the Dynamic Thin Provisioning volume 54a is issued to the storage setting program 50 of the storage device 4, and the instruction for setting the server flash is issued to the host setting program 41 of the host management computer 35. The process then ends (S22).

In S21, the Tiering Policy including the Flash media is set if the storage flash has the vacant capacity equal to or more than the designated value. It is possible to add the conditional branch that the Tiering Policy with high Tier1 rate is allocated in the case of High value stored in the Required Performance 69 of the server information table 31, and the Tiering Policy with low Tier1 rate is allocated in the case of Low value stored in the Required Performance 69 of the server information table 31 is Low. It is also possible to add any other conditions.

The second example allows generation of the configuration scheme that matches the performance characteristics based on the type and layout location of the physical storage media even if the plurality of host computers using the server flash share the storage device, and use the Dynamic Thin Provisioning volume is used. This makes it possible to improve I/O performance of the entire computer system.

Example 3

A third embodiment will be described. In the following description, the structure different from the one described in the first embodiment will be specifically explained, and explanation of the structure similar to the one described in the first embodiment will be omitted. In the first embodiment, the resource allocation scheme generation program 2 of the storage management computer 1 generates the allocation scheme of the logical volume 54 of the storage device 4 and the storage media group 7 including the server flash of the host computer 5 in response to the input. Meanwhile, in the embodiment, the storage management computer 1 according to this embodiment generates the scheme which changes the allocation of the resource that has been already allocated.

In the third embodiment, the process executed by the resource allocation scheme generation program 2 of the storage management computer 1 is partially changed. The partially changed process will be described hereinafter.

FIG. 13 shows process steps mainly executed by a resource allocation scheme generation program 2b according to the third embodiment. Compared with the resource allocation scheme generation program 2 according to the first embodiment, the resource allocation scheme generation program 2b has process steps different from S1, S2 and S20 of the allocation resource determination process S3. The rest of the process steps are the same as those described in the first embodiment.

The resource allocation scheme generation program 2b repeatedly executes the process steps S26 and S3 with respect to the allocated logical volume 54. The allocated logical volume 54 refers to the one which is stored in the storage volume table 32 in association with the VM and the like. The resource allocation scheme generation program 2b makes reference to the storage volume table 32, and acquires the Random rate and the Read rate of the logical volume, for example, the logical volume capacity 73, the VM and the like to which the logical volume is allocated as the information about the allocated logical volume 54 (S26). The allocation resource determination process S3 is executed by setting the VM and the like, to which the acquired logical volume is allocated as the request VM and the like, setting the logical volume capacity as the request allocation capacity, and setting the information about the Random rate and the Read rate as the request access pattern and the request I/O type, respectively. In S20 of the allocation resource determination process S3, the configuration changing scheme is generated so as to output the announcement recommending implementation of the configuration changing scheme.

The logical volume allocated to the VM and the like with high Required Performance that has been defined is preferentially executed. This makes it possible to preferentially allocate the logical volume constituted by the server Flash and the Flash media to the VM and the like with high Required Performance. In S20, setting instruction to the host computer 5 and the storage device 4 is not executed, but generation and output of the allocation scheme are only executed. However, the configuration changing scheme may be implemented by changing the configuration for continuing the I/O to the host computer 5 and the VM 6 in advance.

The third example allows re-configuration of the structure that matches the performance characteristics based on the type and layout location of the physical storage media even if the resource has been allocated in the structure having the storage device shared by the plurality of host computers using the server flash. This makes it possible to improve the I/O performance of the entire computer system.

Example 4

A fourth embodiment will be described. In the following description, the structure different from that of the first embodiment will be specifically explained, and explanation of the structure similar to the one described in the first embodiment will be omitted. In the first embodiment, the resource allocation scheme generation program 2 of the storage management computer 1 generates the allocation scheme of the logical volume 54 of the storage device 4 and the storage media group 7 including the server flash of the host computer 5 in response to the input. Meanwhile, the storage management computer 1 according to the embodiment generates the scheme which changes the allocated resource upon transfer of the data in the first logical volume 54 to the second logical volume 54.

In the fourth embodiment, the process of the resource allocation scheme generation program 2 of the storage management computer 1 is partially changed. The partially changed process will be described hereinafter.

The process executed by a resource allocation scheme generation program 2c according to the fourth embodiment will be described. Compared with the resource allocation scheme generation program 2 of the first embodiment, the resource allocation scheme generation program 2c has the process steps different from S1, S2 and S20 of the allocation resource determination process S3. The rest of the process steps are the same as those described in the first embodiment.

The resource allocation scheme generation program 2c receives the information about the logical volume 54 as the transfer source and transfer destination of data (S30). The resource allocation scheme generation program 2c makes reference to the storage volume table 32, and acquires the received information about the logical volume 54 of the data transfer source such as the logical volume capacity 73, the host computer 4 and the VM 6 to which the logical volume is allocated, and Random rate and Read rate of the logical volume (S31). Then the allocation resource determination process S3 is executed by setting the VM and the like, to which the acquired logical volume is allocated as the request VM and the like, setting the logical volume capacity as the required allocation capacity, and the information about the Random rate and the Read rate as the request access pattern and the request I/O type, respectively. In S20 of the allocation resource determination process S3, the configuration changing scheme is generated as the storage area allocation scheme with respect to the logical volume as the transfer destination so as to output the announcement recommending implementation of the allocation scheme.

In S20, the setting instruction to the host computer 5 and the storage device 4 is not executed, but the allocation scheme is only generated and output. However, the configuration changing scheme may be implemented by changing the configuration for continuing the I/O to the host computer 4 and the VM 6 in advance.

The fourth example allows re-configuration of the structure that matches the performance characteristic based on the type and layout location of the physical storage media even if the data of the logical volume 54 are transferred in the structure having the storage device shared by the plurality of host computers using the server flash. This makes it possible to improve the I/O performance of the entire computer system.

Example 5

A fifth embodiment will be described. In the following description, the structure different from that of the first embodiment will be specifically explained, and explanation of the structure similar to the one described in the first embodiment will be omitted. In the first embodiment, the resource allocation scheme generation program 2 of the storage management computer 1 generates the allocation scheme of the logical volume 54 of the storage device 4 and the storage media group 7 including the server flash of the host computer 5 in response to the input. Meanwhile, the storage management computer 1 according to the embodiment generates the scheme which changes the allocation of the already allocated resource upon transfer of the data of the VM 6 from the first logical volume 54 to the second logical volume 54.

In the fifth embodiment, the process of the resource allocation scheme generation program 2 of the storage management computer 1 is partially changed. The partially changed process will be described hereinafter.

The server information table 31 and the storage volume table 32 according to the fifth embodiment store the information about throughput in addition to the table information according to the first embodiment. The throughput refers to the processing capacity of the storage area and the I/O issue source per unit time. Specifically, the server information table 31 includes the Throughput Performance column, and stores the throughput information for each of the VMs. For example, the table stores the information about Throughput Performance of VM001 of the Sv001 set to "50 GB/s". The storage volume table 32 includes the Throughput Performance column, and stores the throughput information for each of the logical volumes. For example, the table stores the information about Throughput Performance of the VOL1 set to "100 GB/s".

FIG. 14 represents the process of a resource allocation scheme generation program 2d according to the fifth embodiment. Compared with the resource allocation scheme generation program 2 of the first embodiment, the resource allocation scheme generation program 2d has process steps different from S1, S2 and S20 of the allocation resource determination process S3. The rest of the process steps are the same as those described in the first embodiment.

The resource allocation scheme generation program 2d receives the information about the VM 6 to be transferred, and the information about the logical volume 54 as the destination to which the VM 6 is transferred from the host management computer 35 (S35). Based on the information about VM acquired in S35 and the information of the storage volume table 32, the resource allocation scheme generation program 2d acquires the information about the logical volume as the transfer source which stores the data of the VM 6 to be transferred (S36)

The resource allocation scheme generation program 2d repeatedly executes S38 and S3 with respect to the logical volumes 54 as the transfer source and the transfer destination. The resource allocation scheme generation program 2d makes reference to the storage volume table 32, and acquires the information about the logical volume 54 before/after the transfer, for example, each capacity of the respective logical volumes, and information about the host computer 4 and the VM 6 to which the respective logical volumes are allocated so as to calculate Random rate and Read rate of the logical volume (S38).

In S38, the respective ratios are calculated in consideration of transfer of the VM data. In the case of execution of the process of the logical volume 54 as the transfer source, in which the VM data are stored before transfer, on the assumption that the VM data has transferred, the Random rate and the Read rate will be calculated with respect to the rest of the stored data. In the case of execution of the process of the logical volume 54 to which the VM is transferred, the information about the logical volume of the transfer source before transfer of the VM is acquired as the performance required for the logical volume as the transfer destination after the transfer.

In the case of execution of the process of the logical volume 54 from which the VM is transferred, specifically, the reference is made to the storage volume table 32. If it is determined that the data other than the subject VM data are stored on the subject logical volume, the logical volume is re-configured. The subject logical volume throughput performance is acquired from the storage volume table 32. Then the reference is made to the server information table 31 so as to acquire the total capacity of the subject VM data (VM Capacity 120), and the throughput performance with respect to the VM. For example, on the assumption that the throughput performance of the logical volume is 100 GB/s, the Read ratio is 50%, the throughput performance of the VM is 50 GB/s, and the Read ratio is 80%, the Read ratio upon the VM transfer is calculated by the following formula:

$$(100 \text{ GB/s}*50\%-50 \text{ GB/s}*80\%/(100 \text{ GB/s}-50 \text{ GB/s})=20\%.$$

Likewise, the Random rate is calculated based on values of the throughput performance and the I/O ratio of the entire logical volume and the VM.

The allocation resource determination process S3 is executed using the information about the Random rate and the Read rate acquired in S38 as the request access pattern and the request I/O type. In S20 of the allocation resource determination process S3, the configuration changing scheme is generated with respect to the storage areas to be allocated to the logical volumes as the transfer source and the transfer destination so as to output the announcement recommending implementation of the configuration changing scheme. In S20, setting instruction to the host computer 5 and the storage device 4 is not executed, but the configuration changing scheme is only generated and output. However, the configuration changing scheme may be implemented by changing the configuration for continuing the I/O to the host computer 5 and the VM 6 in advance.

The fifth example allows change in allocation of the storage resource that matches the performance characteristics based on the type and layout location of the physical storage media even if the data of the VM 6 are transferred from the first logical volume 54 to the second logical volume 54 in the structure having the storage device shared by the plurality of host computers using the server flash. This makes it possible to improve the I/O performance of the entire computer system.

In the respective examples, the Flash media have been described as those to be managed as an example. It is to be understood that the target to be managed is not limited to the Flash media. For example, the respective embodiments may be applied to the storage resource with high performance, which is required to be effectively utilized, for example, NVDIMM (Non-Volatile Dual In-line Memory Module).

In the respective examples, the host computer and the VM have been described as those subjected to allocation. It is possible to generate the scheme for allocating the resource to the object and application other than the VM, which are stored in the storage area of the storage device, and run on the host computer.

REFERENCE SIGNS LIST

1: storage management computer,
4: storage device,
5: host computer,
35: host management computer.

The invention claimed is:

1. A management computer which communicates with a host computer and a storage device, comprising:
   a memory configured to store configuration information including information about a plurality of storage media each having a different performance level in the host computer and the storage device, while indicating a storage area supplied from the storage media and the host computer with their association, information about a virtual machine stored in the storage area and executed by the host computer in association with the storage area, and information about a required performance of the virtual machine; and
   a CPU connected to the memory, and configured to receive an allocation request of the storage area to the virtual machine executed by the host computer, which contains information about access characteristics by the host computer and a capacity of the storage area to be allocated, select the storage medium capable of providing the storage area with the capacity from the storage media of the storage device and the host computer based on the access characteristics included in the allocation request in reference to the configuration information, generate a configuration scheme for allocating the storage area with the capacity from the selected storage media to the host computer, and output the configuration scheme,
   wherein the storage media of the host computer and the storage device include at least one Flash Memory Drive,
   wherein the CPU is configured to generate the configuration scheme for allocating the storage area to the virtual machine with a higher required performance preferentially to a Flash Memory Drive in reference to the configuration information, and
   wherein the CPU is further configured to control allocation of the storage area to the host computer based on the configuration scheme.

2. The management computer according to claim 1, wherein the information about the access characteristics included in the allocation request includes information about a ratio of a Random I/O and a Sequential I/O, and information about a ratio of a Read I/O and a Write I/O, both of which are issued by the virtual machine.

3. The management computer according to claim 2, wherein the CPU determines whether or not the Flash Memory Drive of the host computer is allocated as a cache which is usable by the virtual machine based on the information about the ratio of the Random I/O and the Sequential I/O, and the ratio of the Read I/O and the Write I/O, and generates the configuration scheme based on whether the Flash Memory Drive of the host computer is allocated as the cache which is usable by the virtual machine.

4. The management computer according to claim 3, wherein the CPU is further configured to calculate a first threshold value of a vacant capacity of the Flash Memory Drive of the host computer, determine whether or not the Flash Memory Drive of the host computer is allocated to the virtual machine based on the first threshold value, and change the first threshold value based on the ratio of the Random I/O and the Sequential I/O, and the ratio of the Read I/O and the Write I/O, both of which are included in the allocation request.

5. The management computer according to claim 4, wherein
the CPU is further configured to, in the case of a large value of the Read I/O ratio, the CPU is configured to calculate the first threshold value that is smaller than one obtained in the case of a small value of the Read I/O ratio so as to generate the configuration scheme for preferentially allocating the Flash Memory Drive of the host computer to the virtual machine with the large Read I/O ratio.

6. The management computer according to claim 1, wherein:
the host computer is one of a plurality of host computers that constitute a tenant which allows a plurality of virtual machines, including the virtual machine, to share the storage media; and
the CPU is further configured to search whether or not the host computer having the storage medium corresponding to the access characteristics exists among the host computers that constitute the tenant to which the host computer allowing an operation of the virtual machines belongs, and generate the configuration scheme for allocating the storage area to the virtual machine from the storage medium of the searched host computer if it is determined that the host computer exists.

7. The management computer according to claim 5, wherein:
the host computer is one of a plurality of host computers that constitute a tenant which allows a plurality of virtual machines, including the virtual machine, to share the storage media; and
the CPU is further configured to calculate a second threshold value of a capacity of the Flash Memory Drive of the host computer on which the virtual machine runs based on a vacant capacity of the storage medium of another host computer belonging to the same tenant as that of the host computer on which the request virtual machine runs, determine whether or not the Flash Memory Drive of the storage device is allocated to the virtual machine based on the second threshold value, and generate the configuration scheme.

8. A management computer which communicates with a host computer and a storage device, comprising:
a memory configured to store configuration information including information about a plurality of storage media each having a different performance level in the host computer and the storage device, while indicating a storage area supplied from the storage media and the host computer with their association, and to store hierarchy policy information indicating a rate of the capacity supplied by the plurality of storage media of the storage device, each having different performance to the storage area supplied by the storage device; and
a CPU connected to the memory, and configured to receive an allocation request of the storage area to the host computer, which contains information about access characteristics by the host computer and a capacity of the storage area to be allocated, select the storage medium capable of providing the storage area with the capacity from the storage media of the storage device and the host computer based on the access characteristics included in the allocation request in reference to the configuration information, generate a configuration scheme for allocating the storage area with the capacity from the selected storage media to the host computer based on the hierarchy policy corresponding to the access characteristics contained in the request to the host computer in reference to the hierarchy policy information, and output the configuration scheme, and
wherein the CPU is further configured to control allocation of the storage area to the host computer based on the configuration scheme.

9. The management computer according to claim 1, wherein: the configuration information further includes information about the access characteristics of the storage area in association with the host computer; and the CPU is further configured to, after receiving the allocation request, generate a configuration changing scheme for allocating a different storage area from the storage media of the storage device or the host computer to the host computer in association with the storage area based on the information about the storage area capacity and the access characteristics to the storage area in reference to the configuration information.

10. A management computer which communicates with a host computer and a storage device, comprising:
a memory configured to store configuration information including information about a plurality of storage media each having a different performance level in the host computer and the storage device, while indicating a storage area supplied from the storage media and the host computer with their association, and information about a capacity of a logical volume to which the storage area is supplied from the storage medium and the host computer with their association, and to further store information about the access characteristics with respect to the logical volume; and
a CPU connected to the memory, and configured to receive an allocation request of the storage area to the host computer, which contains information about access characteristics by the host computer and a capacity of the storage area to be allocated, select the storage medium capable of providing the storage area with the capacity from the storage media of the storage device and the host computer based on the access characteristics included in the allocation request in reference to the configuration information, generate a configuration scheme for allocating the storage area with the capacity from the selected storage media to the host computer, and output the configuration scheme,
wherein the CPU is further configured to control allocation of the storage area to the host computer based on the configuration scheme
wherein, in response to transfer of data stored in the logical volume to another logical volume, the CPU is further configured to generate a configuration changing scheme for allocating the storage area from the storage media of the storage device or the host computer with respect to the host computer in association with the logical volume based on the information about the capacity of the logical volume as a transfer source and the access characteristics to the logical volume as the transfer source in reference to the configuration information, and wherein the CPU is further configured to control allocation of the storage area to the host computer based on the configuration changing scheme.

11. The management computer according to claim 1, wherein:

the configuration information includes information about a logical volume to which the storage area is supplied from the storage medium and the virtual machine with their association, information about the access characteristics to the logical volume, and information about the logical volume, and throughput of the virtual machine in association with the logical volume; and wherein the CPU is further configured to, in response to transfer of data of the virtual machine stored in a first logical volume to a second logical volume instead of receiving the request, calculate the access characteristics after the transfer of the data from the first logical volume using the access characteristics to the first logical volume included in the configuration information, the first logical volume, and the throughput of the virtual machine in reference to the configuration information, calculate the access characteristics to the first logical volume included in the configuration information as the access characteristics of the second logical volume after the data transfer, and generate the configuration changing scheme for allocating the storage area from the storage media of the storage device or the host computer to the first and the second logical volumes.

* * * * *